July 30, 1946.　　　O. R. PRINGLE　　　2,405,054
ELEVATING END GATE
Filed Jan. 24, 1945　　　4 Sheets-Sheet 1
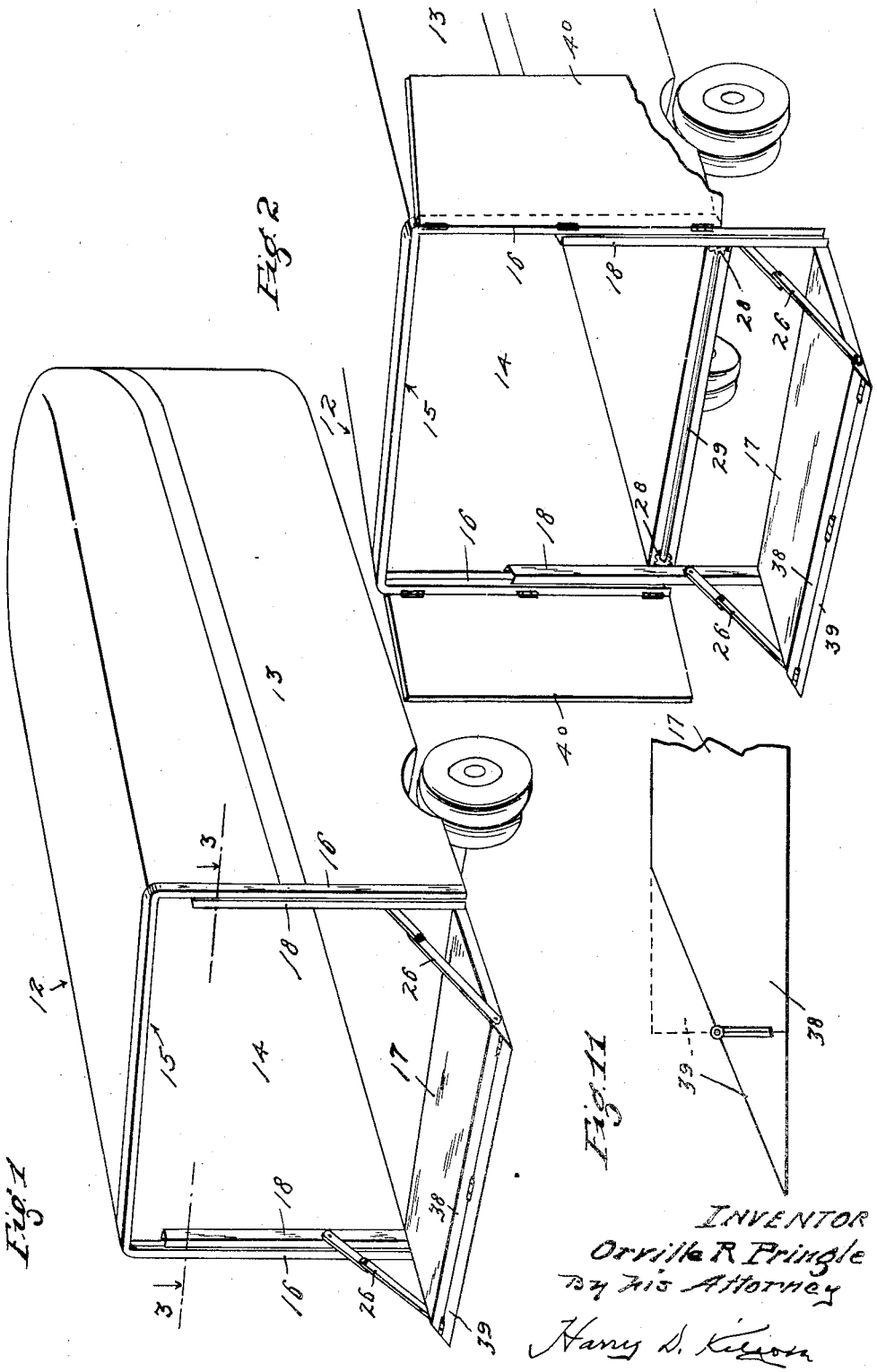
INVENTOR
Orville R Pringle
By His Attorney
Harry L. Kitson

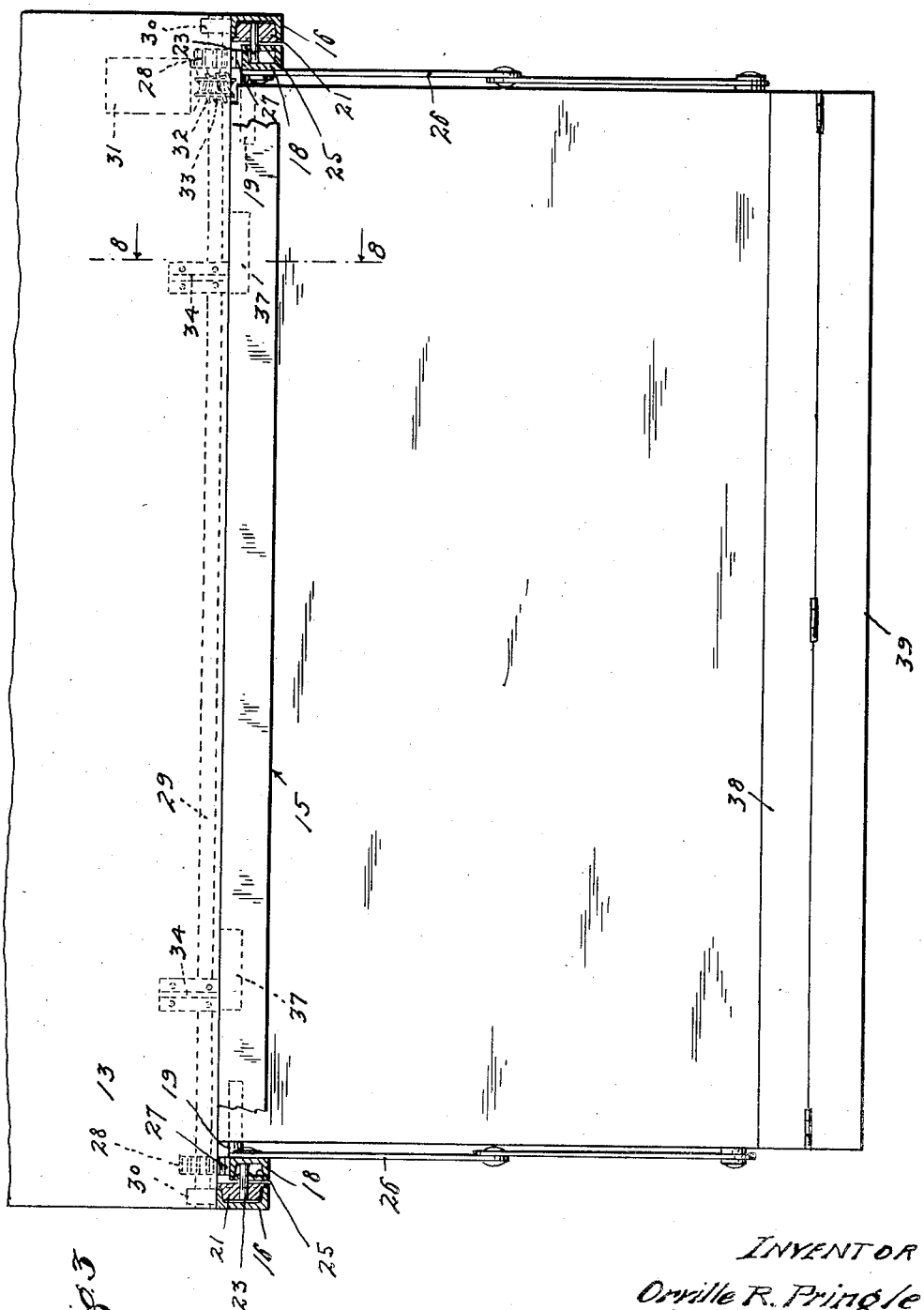

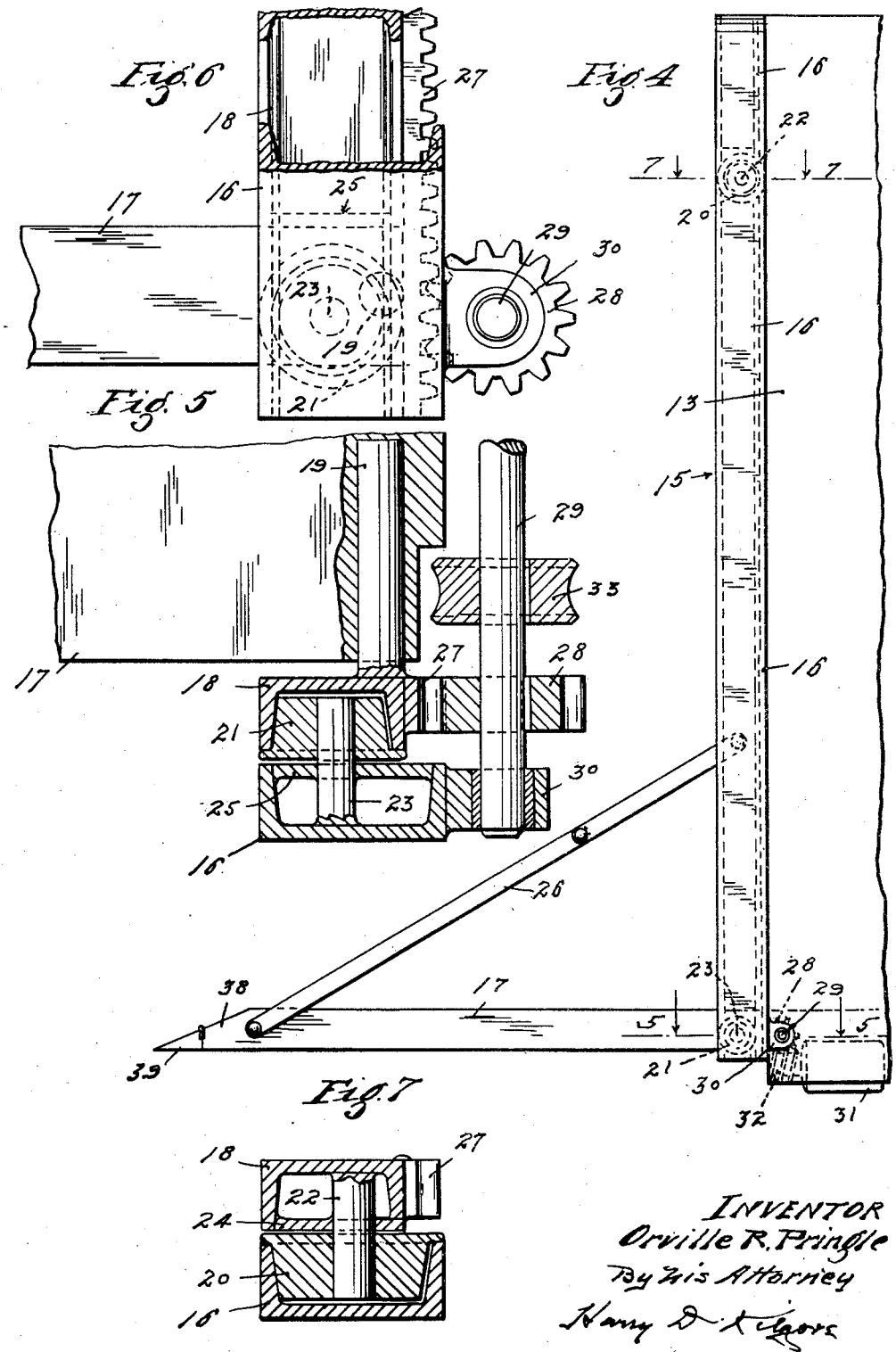

July 30, 1946.  O. R. PRINGLE  2,405,054
ELEVATING END GATE
Filed Jan. 24, 1945  4 Sheets-Sheet 4
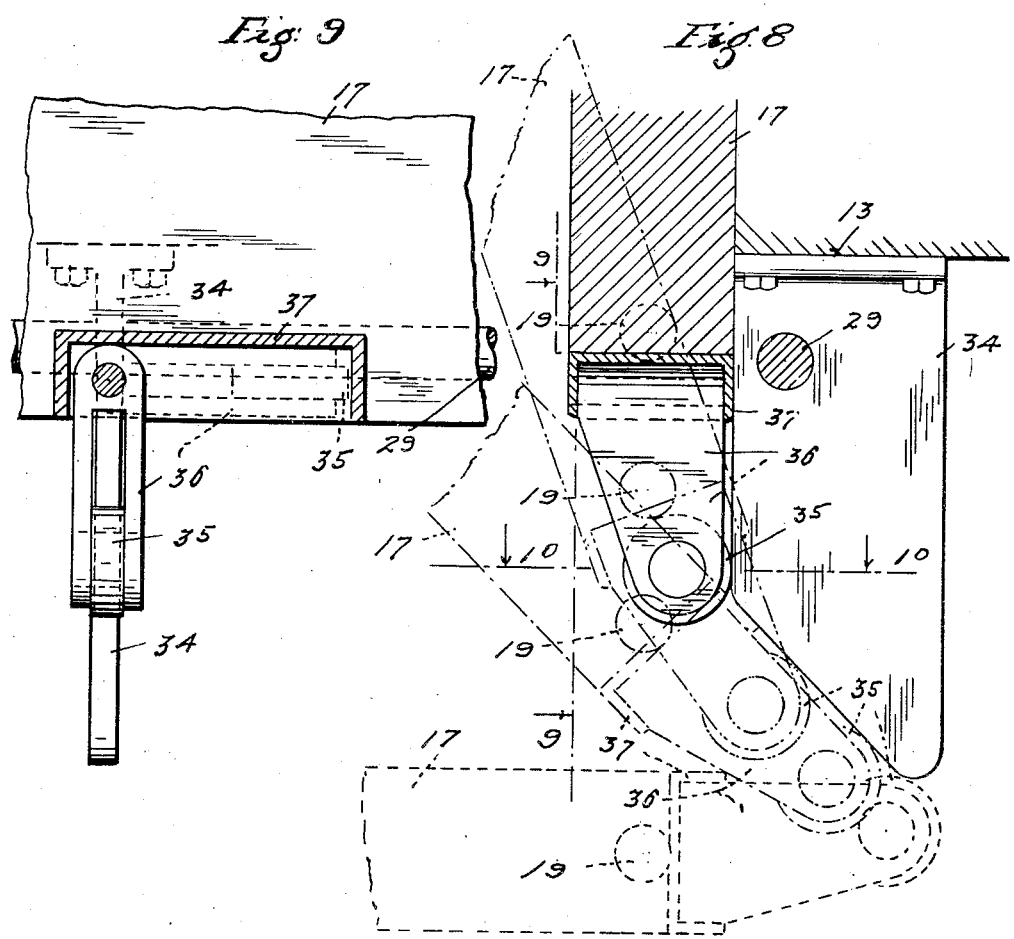
INVENTOR
Orville R. Pringle
By his Attorney
Harry D. Kilgore Patented July 30, 1946

2,405,054

UNITED STATES PATENT OFFICE 2,405,054

ELEVATING ENDGATE

Orville R. Pringle, Minneapolis, Minn.

Application January 24, 1945, Serial No. 574,358

5 Claims. (Cl. 214—75)

My invention relates to improvements in elevating gates for vans and other vehicles.

The object of this invention is to facilitate the loading and unloading of vans and other vehicles and the opening and closing of the gates thereof.

To the above end the invention consists of the novel devices and combination of devices hereinafter described and defined in the claims.

In the accompanying drawings, which illustrate the invention, like characters indicate like parts throughout the several views.

Referring to the drawings:

Fig. 1 is a perspective view of a van having the invention embodied therein, and showing an end gate positioned in the plane of the floor of the van.

Fig. 2 is a view corresponding to Fig. 1 with the exception that the gate is in a lowered position, and the front portion of the van removed, and further showing a pair of folding doors in partially opened position.

Fig. 3 is a view principally in plan, with some parts broken away and other parts sectioned on the line 3—3 of Fig. 1 on an enlarged scale.

Fig. 4 is a side elevation of the parts as shown in Fig. 3.

Fig. 5 is a fragmentary detail view partly in plan and partly in section taken on the line 5—5 of Fig. 4 on an enlarged scale.

Fig. 6 is a side elevation of the parts shown in Fig. 5.

Fig. 7 is a view partly in plan and partly in transverse section taken on the line 7—7 of Fig. 4 on an enlarged scale.

Fig. 8 is a fragmentary detail view partly in side elevation and partly in section taken on the line 8—8 of Fig. 3, on an enlarged scale, and also showing some of the parts in several different positions by means of broken lines.

Fig. 9 is a view partly in elevation and partly in section taken on the irregular line 9—9 of Fig. 8.

Fig. 10 is a detail view partly in elevation and partly in section taken on the line 10—10 of Fig. 8, and Fig. 11 is a fragmentary detail view of the ramp portion of the end gate and also showing, by means of broken lines, the relatively movable section of the ramp folded onto the relatively fixed section thereof.

The numeral 12 indicates a van, as an entirety, with the exception of its body 13 having in its rear end an end gate opening 14.

A yoke-like channel bar 15 affords a frame for the end gate opening 14 and is rigidly secured to the rear ends of the sides and the top of the body 13. The side flanges of the channel bar 15 are turned inwardly relative to the plane of said channel bar. The legs of the channel bar 15 afford a pair of fixed upright tracks 16 and the transverse portion of said channel bar affords a cross-tie for the tracks 16 at their upper ends.

An end gate 17 for the end gate opening 14 is carried by a pair of upright movable tracks 18. These movable tracks 18 are in the form of channel bars positioned between the fixed tracks 16 and in the same vertical plane. The side flanges of the movable tracks 18 extend toward the side flanges of the fixed tracks 16. By reference to Figs. 5, 6 and 7 it will be noted that the movable tracks 18 are narrower than the fixed tracks 16 and that the outer side flanges of said tracks are flush.

A pair of axially aligned hinge pins 19, rigidly secured to the movable tracks 18, at their lower end portions, extend into bores in the end gate 17, at their lower or inner corner portions, see Fig. 5. These hinge pins 19 hingedly connect the end gate 17 to the movable tracks 18 for swinging movement from a closed upturned upright position, between said tracks in the plane thereof, into an outturned horizontal position.

Upper and lower pairs of flanged rollers 20 and 21, respectively, are arranged to run, the former in the fixed tracks 16 and the latter in the movable tracks 18. These pair of rollers 20 and 21 mount the movable tracks 18 on the fixed tracks 16 for endwise travel to raise or lower the end gate 17, as will presently appear. The pair of rollers 20 and 21 are journaled on pair of studs 22 and 23, respectively, rigidly secured to the tracks 18 and 16, respectively. The studs 22 and 23 extend through reinforcing plates 24 and 25 respectively, rigidly secured to the side flanges of the tracks 18 and 16, respectively. Jointed links 26 pivoted, at one of their ends, to the movable tracks 18 and at their other ends to the end gate 17. These links 26 support the end gate 17 in its horizontal position.

The movable tracks 18 are operated, to raise or lower the end gate 17, by means of racks 27 and cooperating pinions 28. Said racks 27 are rigidly secured to the inner side flanges of the movable tracks 18 and the pinions 28 are keyed to a horizontal transverse shaft 29. The shaft 29 is journaled in bearings 30 on the lower end portions of the fixed tracks 16. Obviously the racks 27 and cooperating pinions 28 keep the end gate 17 in an even position at all times.

The shaft 29 is driven in either direction, to either raise or lower the end gate 17, by means of a reversible electric motor 31 mounted in any suitable manner on the under side of the van body 13. The driving connections from the motor 31 to the shaft 29 are a worm 32 on the armature shaft of said motor and a cooperating worm wheel 33 keyed to the shaft 29. Obviously the worm 32 and the intermeshing worm wheel 33 afford a brake for holding the movable tracks 18 with the end gate 17 in any desired position.

The motor 31 will be operated from the battery for an internal combustion engine by which the van 12 is propelled and the switch for controlling the motor 31 may be located at any convenient place on said van. For the purpose of this case it is not thought necessary to show the wiring for the motor 31, the battery or the switch.

When the end gate 17 is in its uppermost horizontal position it is flush with the floor of the van body 13. From its uppermost horizontal position the end gate 17 may be lowered until it rests on the road bed or stopped at any desired intermediate position between its two extreme positions. The end gate 17 may be raised or lowered in either its upright or horizontal position.

To automatically close the gate 17, during its upward movement from a lowered horizontal position and for controlling the opening movement of said gate, during its lowering movement from its closed upright position, I provide a pair of cams 34 and cooperating rollers 35. Each cam 34 is secured to the under side of the van body 13 and the respective roller 35 is journaled on a swing arm 36. This arm 36 is pivoted in a box 37 mounted in a recess in the inner edge portion of the end gate 17. The boxes 37 and associated parts are located near the inner corner portions of the end gate 17. When the end gate 17 is being either raised or lowered in a horizontal position the arms 36 must be folded into the boxes 37. Suitable means, not shown, may be provided for holding the arms 36 folded in the boxes 37.

The outer or free edge portion of the end gate 17 is in the form of a ramp 38, having a hinged section 39. This hinged ramp section 39 is constructed and arranged to be folded onto the relatively fixed section of the ramp 38 and when thus folded forms a square edge portion on the end gate 17.

A pair of doors 40 is hinged to the channel bar 15 for opening and closing movements.

From the above description it is evident that the end gate 17 may be lowered into a horizontal position, a load placed thereon and the end gate 17 raised until it is flush with the floor of the van body 13 and then said load moved into the van 12 without having to do any lifting. The removal of a load from the van 12 is accomplished in the same manner except in reverse order.

It will be understood that the invention described is capable of various modifications within the scope of the invention herein disclosed and claimed.

What I claim is:

1. The combination with a vehicle body, of means for mounting a gate on the vehicle body for raising and lowering movements, a gate hinged to the gate mounting means for movement from an upturned upright position into an outturned horizontal position, means for operating the gate mounting means to raise the gate, and automatic means for moving the gate from its outturned horizontal position into its upright position during the raising thereof, said automatic means may be manually controlled to render the same operative or inoperative, at will.

2. The combination with a vehicle body, of means for mounting a gate on the vehicle body for raising and lowering movements, a gate hinged to the gate mounting means for movement from an upturned upright position into an outturned horizontal position, means for operating the gate mounting means to raise the gate, and automatic means for moving the gate from its outturned horizontal position into its upright position during the raising thereof, said automatic means including a cam and roller arranged to run on a cam.

3. The combination with a vehicle body, of means for mounting a gate on the vehicle body for raising and lowering movements, a gate hinged to the gate mounting means for movement from an upturned upright position into an outturned horizontal position, means for operating the gate mounting means to raise the gate and automatic means for moving the gate from its outturned horizontal position into its upright position during the raising thereof, said automatic means including a cam, a pivoted arm, and a roller, journaled on the arm and arranged to run on the cam, said arm being operable to position the roller in an operative position on the cam or in the inoperative position away from the cam.

4. The combination with a vehicle body, of a gate, means supporting the gate for raising and lowering movement, said gate being hinged to its supporting means for movement from an upturned upright position into an outturned horizontal position, and means for operating the gate supporting means to raise the gate when in either its upright or horizontal position, the outer transverse portion of the gate being in the form of a ramp having a beveled hinged section foldable onto the other section of the ramp.

5. The combination with a vehicle body, of a gate, means supporting the gate for raising and lowering movements, said gate being hinged to its supporting means for movement from an upturned upright position into an outturned horizontal position, and means for operating the gate supporting means to raise the gate when in either its upright or horizontal position, the outer transverse portion of the gate being in the form of a ramp having a hinged section foldable onto the other section of the ramp, said ramp, when its hinged section is folded onto the other section of the ramp, form a square edge portion of the gate.

ORVILLE R. PRINGLE.